United States Patent
Yan et al.

(10) Patent No.: US 10,785,707 B2
(45) Date of Patent: Sep. 22, 2020

(54) COMMUNICATING AN INDICATOR EXTENDING AN AREA SCOPE OF SYSTEM INFORMATION

(71) Applicant: BlackBerry Limited, Waterloo (CA)

(72) Inventors: Gao Yan, Beijing (CN); Andrew John Farnsworth, Kidderminster (GB); Tomasz Henryk Mach, Fleet (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/194,057

(22) Filed: Nov. 16, 2018

(65) Prior Publication Data

US 2019/0090177 A1    Mar. 21, 2019

Related U.S. Application Data

(63) Continuation of application No. 14/907,673, filed as application No. PCT/CN2013/080319 on Jul. 29, 2013, now Pat. No. 10,182,390.

(51) Int. Cl.
*H04W 48/10* (2009.01)
*H04W 76/10* (2018.01)
(Continued)

(52) U.S. Cl.
CPC .......... *H04W 48/10* (2013.01); *H04W 48/12* (2013.01); *H04W 48/20* (2013.01); *H04W 76/10* (2018.02); *H04W 48/16* (2013.01)

(58) Field of Classification Search
CPC .......... H04W 72/042; H04W 74/0833; H04W 76/046; H04W 48/12; H04W 36/0055;
(Continued)

(56) References Cited

U.S. PATENT DOCUMENTS

| 6,628,946 B1 | 9/2003 | Wiberg |
| 2010/0103854 A1 | 4/2010 | Lee |

(Continued)

FOREIGN PATENT DOCUMENTS

| CN | 101707737 A | 5/2010 |
| CN | 101754295 | 6/2010 |

(Continued)

OTHER PUBLICATIONS

3GPP-TSG-RAN WG1#67—R1-114193—Source: CMCC, Title: Discussion on the common solution for FDD and TDD on improving PCI and system information detection in the presence of dominant interferer, Agenda Item: 7.3.2., Document for: Discussion and Decision, Nov. 14-18, 2011 (4 pages).

(Continued)

*Primary Examiner* — Allahyar Kasraian
(74) *Attorney, Agent, or Firm* — Trop, Pruner & Hu, P.C.

(57) ABSTRACT

In some examples, a first wireless access network entity receives, from a second wireless access network entity, a system information configuration of the second wireless access network entity, and identifies, based on the received system information configuration, common system information between the first and second wireless access network entities. The first wireless access network entity sends, to a user equipment (UE), an indicator extending an area scope of the common system information.

17 Claims, 5 Drawing Sheets

(51) Int. Cl.
*H04W 48/12* (2009.01)
*H04W 48/20* (2009.01)
*H04W 48/16* (2009.01)

(58) Field of Classification Search
CPC . H04W 36/0061; H04W 36/30; H04W 48/10; H04W 36/0016; H04W 36/04; H04W 4/06
See application file for complete search history.

(56) References Cited

U.S. PATENT DOCUMENTS

| | | | |
|---|---|---|---|
| 2013/0273907 | A1 | 10/2013 | Vikberg |
| 2015/0011213 | A1 | 1/2015 | Lou |
| 2015/0063247 | A1 | 3/2015 | Lee |
| 2015/0334697 | A1* | 11/2015 | Song .................... H04W 48/12 455/450 |

FOREIGN PATENT DOCUMENTS

| | | |
|---|---|---|
| CN | 101959286 A | 1/2011 |
| WO | 2013068369 | 5/2013 |

OTHER PUBLICATIONS

3GPP TSG-RAN1 #68bis—R1-121490, Agenda Item: 7.3.2, Source: Fujitsu, Title: Analysis on the potential network assistance for cell detection, Document for: Discussion and decision, Mar. 26-30, 2012 (5 pages).

3GPP TS 25.331 V11.2.0 (Jun. 2012) Technical Specification, 3rd Generation Partnership Project, Technical Specification Group Radio Access Network, Radio Resource Control (RRC), Protocol specification (Release 11), Jun. 2012 (1944 pages).

State Intellectual Property Office of P.R. China (ISA/CN), International Search Report for PCT/CN2013/080319 dated May 9, 2014 (3 pages).

3GPP TS 25.304 V11.0.0 (Sep. 2012), Technical Specification, 3rd Generation Partnership Project; Technical Specification Group Radio Access Network; User Equipment (UE) procedures in idle mode and procedures for cell reselection in connected mode (Release 11) Sep. 2012 (52 pages).

European Patent Office, Extended European Search Report for Appl. No. 13890832.2 dated Mar. 9, 2017 (17 pages).

TSG-RAN Working Group 2 (Radio layer 2 and Radio layer 3) TSGR2#4(99)414 Berlin, Germany, May 25-28, 1999, Agenda Item: 8, Source: Ericsson, Title: Structure of System Information, Document for: Discussion (5 pages).

3GPP TS 25.331 V11.6.0 (Jun. 2013) Technical Specification 3rd Generation Partnership Project; Technical Specification Group Radio Access Network; Radio Resource Control (RRC); Protocol specification (Release 11) (2084 pages).

European Patent Office, Communication pursuant to Article 94(3) EPC for Appl. No. 13890832.2 dated May 16, 2019 (6 pages).

* cited by examiner

COMMUNICATING AN INDICATOR EXTENDING AN AREA SCOPE OF SYSTEM INFORMATION

CROSS REFERENCE TO RELATED APPLICATIONS

This is a continuation of U.S. application Ser. No. 14/907,673, having a national entry date of Jan. 26, 2016, which is a national stage application under 35 U.S.C. § 371 of PCT/CN2013/080319, filed Jul. 29, 2013, which are both hereby incorporated by reference in their entirety.

BACKGROUND

A user equipment (UE) is able to connect to a mobile communications network to perform communications. A mobile communications network is made up of cells that correspond to respective regions in which UEs are able to establish communications with the mobile communications network. In attempting to attach to a cell, a UE monitors system information that is broadcast by the mobile communications network, and in particular, from a wireless access network node (or multiple wireless access network nodes) of the mobile communications network. A wireless access network node is a node of the mobile communications network that is capable of performing wireless communications with UEs. System information includes various information about the mobile communications network and cells.

System information broadcast to UEs includes messages referred to as system information blocks (SIBs) that contain system information elements. There can be various different types of SIBs for carrying different system information.

System information also includes a master information block (MIB), which includes information related to other SIBs. The information relating to other SIBs contained in the MIB includes information referencing the other SIBs as well as scheduling information pertaining to the other SIBs. A UE first reads the information elements of the MIB to allow the UE to read the information elements of the other SIBs.

In some cases, an MIB can also contain information relating to one or more scheduling blocks (SBs), which provide references and scheduling information for additional SIBs (in addition to the SIBs referenced by the MIB).

SUMMARY

In general, according to some implementations, a wireless access network node sends, to a user equipment (UE), an indicator that extends an area scope of system information.

In general, according to further implementations, a UE includes at least one processor to receive an indicator that extends an area scope of system information received by the UE.

In general, according to other implementations, a first wireless access network entity receives, from a second wireless access network entity, a system information configuration of the second wireless access network entity. The first wireless access network entity identifies, based on the received system information configuration, common system information between the first and second wireless access network entities. The first wireless access network entity sends, to a UE, an indicator extending an area scope of the common system information.

Other or alternative features will become apparent from the following description, from the drawings, and from the claims.

BRIEF DESCRIPTION OF THE DRAWINGS

Some embodiments are described with respect to the following figures.

DETAILED DESCRIPTION

In the ensuing discussion, reference is made to mobile communications networks that operate according to the Universal Mobile Telecommunications System (UMTS) technology as provided by the Third Generation Partnership Project (3GPP). UMTS technology is also referred to as the Universal Terrestrial Radio Access (UTRA) technology.

Although reference is made to UTRA in the ensuing discussion, it is noted that techniques or mechanisms according to some implementations can be applied to other wireless access technologies. For example, such other wireless access technologies can include the Long-Term Evolution (LTE) technology, or another type of wireless access technology. The LTE technology is also referred to as the Evolved Universal Terrestrial Radio Access (E-UTRA) technology.

In a UTRA mobile communications network, system information can be organized in a hierarchical manner, such as in the form of a tree. For example, the organization of system information in a tree is described in 3GPP Technical Specification (TS) 25.331, version 11.2.0. The root of the tree includes the MIB, which references scheduling information blocks (SIBs) as well as optional scheduling blocks (SBs). Each SB in turn can reference other SIBs.

Although reference is made to organizing system information of a tree in some implementations, it is noted that in other examples, system information can have other types of arrangements. In a UTRA mobile communication network, example SIBs include SIB type 1 (also referred to as SIB1), SIB type 2 (SIB2), SIB type 3 (SIB3), and so forth. A complete listing of the SIB types can be found in 3GPP TS 25.331, in accordance with some examples. However, it is noted that in alternative implementations, other types of SIBs can be employed.

The SIBs of various different types contain various different information, including information that can be used by a UE to determine whether the UE is allowed to access a cell, information relating to cells, radio resource configuration information, power control information, timers, parameters for cell selection and reselection, parameters for configuration of common physical channels, and so forth.

More generally, an SIB (or system information block) refers to any message or information element that contains information relating to the mobile communications network or one or more cells, where the information is usable by a UE to establish a connection to a cell of the mobile communications network. More generally, reference is made to system information that can be read by a UE for allowing the UE to connect to a cell of a mobile communications network. System information can include an SIB, an MIB, an SB, or any other type of system information.

An SB provides references and scheduling information for additional SIBs (in addition to the SIBs referenced by the MIB).

Each cell can broadcast its respective system information to UEs within the coverage area of the respective cell. More specifically, the system information broadcast in a cell is sent by the wireless access network node of the cell. In a UTRA mobile communications network, a wireless access network node includes a radio network controller (RNC) and a NodeB (NB). In some examples, the RNC carries out radio resource management and some mobility management functions. The RNC controls one or more NodeBs, which are able to wirelessly communicate in respective cells. A NodeB is a base transceiver station that is able to wirelessly transmit and receive signals to and from a UE. The ensuing discussion refers to RNCs. In other examples, techniques or mechanisms can be applied to other types of wireless access network nodes. For example, in an E-UTRA network, the functionalities of the RNC and NodeB are included in an enhanced NodeB (eNB).

An SIB can have one of several different area scopes. An area scope of an SIB defines the area in which an SIB is applicable. An area scope can be at the cell level (a "cell area scope"), in which case a UE considers the SIB to be valid only in the cell in which the SIB was received. In other examples, the area scope can be at the public land mobile network (PLMN) level or an equivalent PLMN level. A PLMN is a network established and operated by a respective network operator. If the area scope for an SIB is the PLMN level, then a UE considers the SIB to be valid only within the PLMN in which the SIB was received. If the area scope of an SIB is at the Equivalent PLMN level, a UE considers the SIB to be valid within the PLMN in which the SIB was received, and other PLMN(s) indicated to be equivalent to the given PLMN.

Note also that an SB or MIB is applicable in just the cell that the SB or MIB was received.

In scenarios where the area scope of SIBs is at the cell level, it is possible for the content of one or more SIB types to be common across multiple cells. For example, the content of SIB1, SIB2, and so forth, can be common across multiple cells. Similarly, the content of an SB can be common across multiple cells, even though traditionally the SB is applicable in just the cell that the SB was received.

Traditionally, a UE may not be aware of the fact that certain system information among neighbouring cells may be the same. As a result, when a UE reselects a new cell to camp to, the UE has to read all of the system information of the new cell, even though some of the system information (e.g. one or more types of SIBs and one or more SBs) may be common with the cell that the UE was previously camped on. Having to read all system information in the new cell can result in a performance penalty at the UE, in terms of energy consumption, increased latency, increased resource usage (e.g. processor and communication component usage), and so forth.

Solution 1

Figure 1:
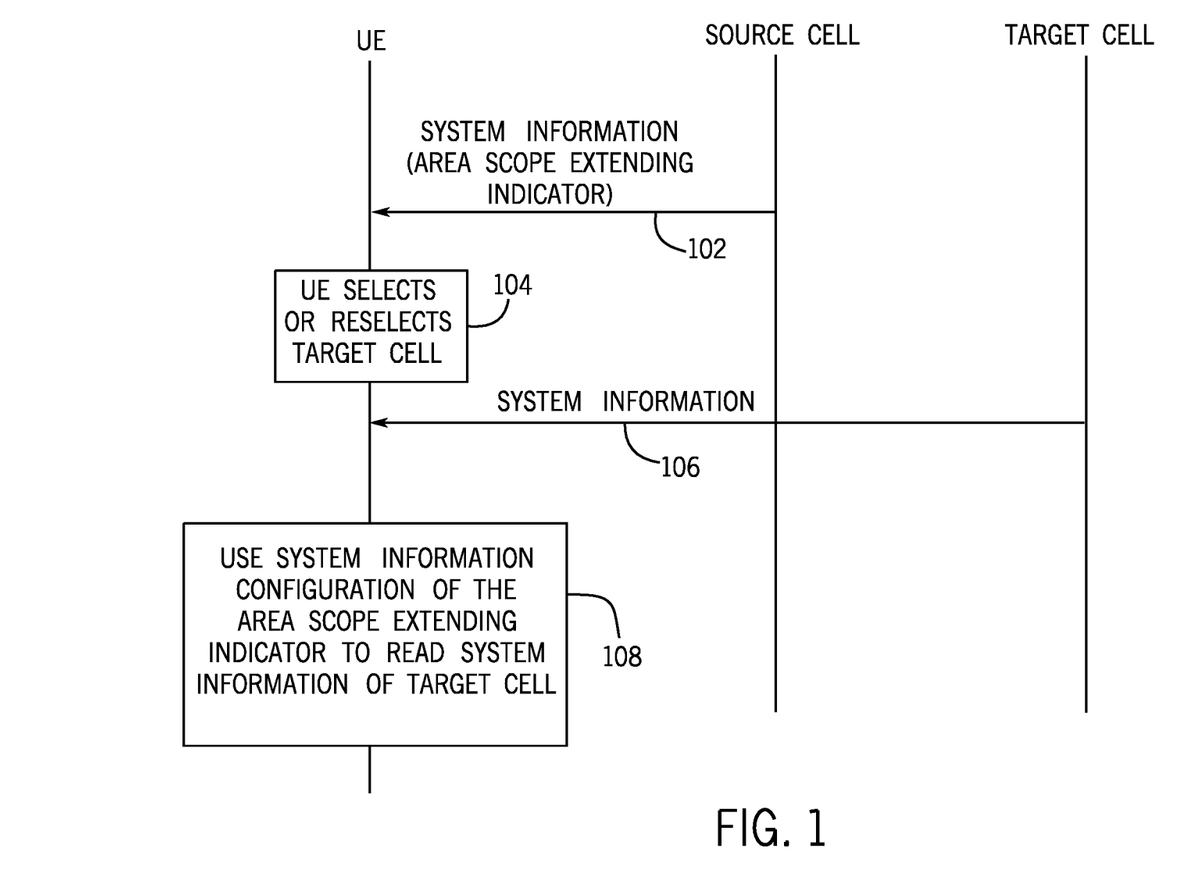
FIGS. 1-3 are flow diagrams of processes for sending an area scope extending indicator by a wireless access network node to a user equipment (UE), according to some implementations.

FIG. 1 is a flow diagram of an example process according to Solution 1, according to some implementations. In FIG. 1, it is assumed that the UE is initially camped on a source cell. A UE being camped on a cell refers to the UE having selected the cell (possibly from among multiple candidate cells) to monitor for information that enables the UE to establish a connection with the cell. The source cell (and more specifically, an RNC of the source cell) sends (at 102) system information to the UE. In accordance with some implementations, the system information (which can include an MIB, SIBs, and SBs) can include an indicator that extends an area scope of certain system information sent by the source cell. This indicator can also be referred to as an "area scope extending indicator."

For example, from the perspective of a UE, certain types of SIBs can have a cell area scope—in other words, absent a different indication from the network, the UE would interpret these SIBs to have the cell area scope. As another example, the UE would interpret SBs to have the cell area scope.

In accordance with some implementations, the area scope extending indicator can be provided by the network (more specifically, an RNC) to indicate to the UE that certain system information is common in an extended area, such as across multiple cells, including the source cell and one or more neighbouring cells of the source cell. The area scope extending indicator extends the area scope of the system information from a first area to a larger extended area.

More specifically, according to some implementations, the area scope extending indicator can contain information identifying which neighbouring cell(s) and which system information (e.g. SIB type(s) or SB(s) or both) is common between the identified neighbouring cell(s) and the source cell.

The information included in the area scope extending indicator is stored by the UE for later use.

Later, the UE selects (or reselects) (at 104) a target cell. For example, this target cell can be one of the neighbouring cell(s) of the source cell identified by the area scope extending indicator to share certain system information with the source cell. Cell selection occurs when the UE is initially powered up or at other times, e.g. when leaving a Radio Resource Control (RRC) Cell_DCH (Dedicated Channel State) state. RRC is described further in 3GPP TS 25.331, in some examples. Upon power up, the UE selects one of multiple cells to camp on (see, for example, 3GPP TS 25.304, version 11.0.0). Cell reselection refers to a process in which the UE is currently camped on a serving cell, and performs reselection of another serving cell based on one or more criteria.

The target cell (and more specifically, an RNC of the target cell) sends (at 106) system information, including an MIB, SIBs, and optionally SBs. Note that the source cell and target cell can be controlled by respective different RNCs (source RNC and target RNC). Alternatively, the source cell and the target cell can be controlled by the same RNC. The UE uses (at 108) the information of the area scope extending indicator (received at 102 from the source cell and stored by the UE) to read the system information transmitted by the target cell. Specifically, based on the information of area scope extending indicator, the UE is aware of which SIB type(s) or which SB(s), or both, is (are) common between the source cell and the target cell. The UE can read and store just a subset of the system information transmitted by the target cell, where the subset of the system information includes system information not identified by the area scope extending indicator to be common with system information previously received by the UE from the source cell.

In this manner, by reading and storing just the subset of system information transmitted by the target cell, UE performance can be enhanced, since the UE does not have to waste processing, storage, and communication resources in reading and storing the common system information (which was previously received by the UE from the source cell).

For the SIB type(s) identified by the area scope extending indicator to be common between the target cell and the source cell, the UE can read the value tag of each such common SIB type, to determine whether or not the common SIB type should be re-read by the UE in the target cell. The value tag of each common SIB type can also be included in the area scope extending indicator.

An SIB can be labeled with a value tag that indicates the validity of a stored SIB in the UE. A stored SIB that is valid can be reused by the UE. The value tag of an SIB is updated when the content of the SIB is changed. For example, the UE may have received SIB1 having a value tag of 1. Later, when the UE determines that the value tag of SIB1 has changed to 2, then the UE will regard the stored SIB1 as invalid, since the stored SIB1 is associated with value tag 1. In this case, the UE will re-read SIB1 transmitted in a cell.

If the UE determines, based on the value tag of a particular SIB type, that the stored particular SIB type is valid (in other words, the value tag of the particular SIB type transmitted by the target cell is the same as the value tag of the particular SIB type stored at the UE), the UE can reuse the stored particular SIB type. However, if the value tag indicates that the particular SIB type stored at the UE is invalid, then the UE re-reads the particular SIB type transmitted by the target cell, even though the area scope extending indicator has indicated that the particular SIB type is common between the target cell and the source cell.

In some implementations, the area scope extending indicator can be included in a new information element of an existing message (e.g. existing SIB type or other message) or in a new message (e.g. new SIB type or other message). A new information element or a new message refers to an information element or message that is not provided by current standards, but which may (or may not) be defined by future standards. An existing message refers to a message provided by current standards.

As a more specific example, the area scope extending indicator can be included in the Intra-frequency measurement system information of SIB type 11 (SIB11). The Intra-frequency measurement system information includes an Intra-frequency cell info list information group that contains neighbouring cell list parameters. Further details regarding the Intra-frequency measurement system information and the Intra-frequency cell info list information group can be found in 3GPP TS 25.331.

An example of the content of the Intra-frequency measurement system information of SIB11 according to 3GPP TS 25.331 is provided below. One of the information elements or information groups included in the Intra-frequency measurement system information is the Intra-frequency cell info list information group. The remaining information elements or information groups in the Intra-frequency measurement system information are described by 3GPP TS 25.331 and will not be further discussed in this disclosure.

| Information Element/Group name | Need | Type and reference |
|---|---|---|
| Intra-frequency measurement identity | MD | Measurement identity 10.3.7.48 |
| Intra-frequency cell info list | OP | Intra-frequency cell info list 10.3.7.33 |
| Intra-frequency measurement quantity | OP | Intra-frequency measurement quantity 10.3.7.38 |
| Intra-frequency reporting quantity for RACH Reporting | OP | Intra-frequency reporting quantity for RACH Reporting 10.3.7.42 |
| Maximum number of reported cells on RACH | OP | Maximum number of reported cells on RACH 10.3.7.43 |
| Reporting information for state CELL_DCH | OP | Reporting information for state CELL_DCH 10.3.7.62 |

The Intra-frequency cell info list information group can be modified to add the area scope extending indicator as a new IE, which can also be referred to in some examples as a Common SIB info IE.

An example of the Intra-frequency cell info list information group is provided in the table below. In the table below, the new information elements (IEs) are underlined. The remaining IEs or information groups of the Intra-frequency cell info list information group are explained in 3GPP TS 25.331.

| Information Element/Group name | Need | Multi | Type and reference |
|---|---|---|---|
| CHOICE Intra-frequency cell removal | OP | | |
| >Remove all intra-frequency cells | | | |
| >Remove some intra-frequency cells | | | |
| >>Removed intra-frequency cells | MP | 1 to <maxCellMeas> | |
| >>>Intra-frequency cell id | MP | | Integer(0 . . . <maxCellMeas> − 1) |
| >Remove no intra-frequency cells | | | |
| New intra-frequency cells | OP | 1 to <maxCellMeas> | |
| >Intra-frequency cell id | OP | | Integer(0 . . . <maxCellMeas> − 1) |
| >Cell info | MP | | Cell info 10.3.7.2 |
| > Common SIB info | CV-BCH | 1 to <maxCommSIB> | |
| >> Common SIB indicator | MP | | Enumerated(SIB1, SIB2, SIB5, . . .) |
| >> Value tag | MD | | Integer (1 . . . 4) |
| >CHOICE mode specific info | MP | | |
| >>No information | | | |
| >>TDD 1.28 Mcps | | | |
| >>> SNPL Monitor Set Indicator | OP | | Bit string(5) |

| Information Element/Group name | Need | Multi | Type and reference |
|---|---|---|---|
| Cells for measurement | CV-BCHopt | 1 to <maxCellMeas> | |
| >Intra-frequency cell id | MP | | Integer(0 . . . <maxCellMeas> − 1) |
| CSG Intrafrequency cell info | CV-BCHopt | | 10.3.7.121 |
| Intra-frequency SI Acquisition | CV-BCHopt | | 10.3.7.125 |

A second format of the Intra-frequency cell info list information group including a specific common SIB1 value tag is provided below.

| Information Element/Group name | Need | Multi | Type and reference |
|---|---|---|---|
| CHOICE Intra-frequency cell removal | OP | | |
| >Remove all intra-frequency cells | | | |
| >Remove some intra-frequency cells | | | |
| >>Removed intra-frequency cells | MP | 1 to <maxCellMeas> | |
| >>>Intra-frequency cell id | MP | | Integer(0 . . . <maxCellMeas> − 1) |
| >Remove no intra-frequency cells | | | |
| New intra-frequency cells | OP | 1 to <maxCellMeas> | |
| >Intra-frequency cell id | OP | | Integer(0 . . . <maxCellMeas> − 1) |
| >Cell info | MP | | Cell info 10.3.7.2 |
| > Common SIB info | CV-BCH | 1 to <maxCommSIB> | |
| >> Common SIB indicator | MP | | Enumerated(SIB2, SIB5, . . .) |
| >> Value tag | MD | | Integer (1 . . . 4) |
| >>> SIB1 Value tag | OP | | Integer (1 . . . 256) |
| >CHOICE mode specific info | MP | | |
| >>No information | | | |
| >>TDD 1.28 Mcps | | | |
| >>> SNPL Monitor Set Indicator | OP | | Bit string(5) |
| Cells for measurement | CV-BCHopt | 1 to <maxCellMeas> | |
| >Intra-frequency cell id | MP | | Integer(0 . . . <maxCellMeas> − 1) |
| CSG Intrafrequency cell info | CV-BCHopt | | 10.3.7.121 |
| Intra-frequency SI Acquisition | CV-BCHopt | | 10.3.7.125 |

The new Common SIB Info IE in the table above includes a Common SIB indicator and a value tag. The Common SIB indicator identifies the SIB type (e.g. SIB1, SIB2, etc.) that is common between the source cell and neighbouring cell(s), where the neighbouring cell(s) is (are) identified by part of the Cell Info IE that is included in a New intra-frequency cells information group of the table above. If there are multiple SIB types that are common, then the Common SIB info IE is repeated for each such common SIB type, up to a maximum number (as indicated by a maxCommSIB parameter in the table above).

Similarly, if there are multiple neighbouring cells that share common SIB information, then the Common SIB info IE would be repeated in the New intra-frequency cells information group for each such neighbouring cell. Respective occurrences of the Cell Info IE identifies each respective neighbouring cell. The New intra-frequency cells information group can be repeated up to a maximum number of times, as indicated by a maxCellMeas parameter in the table above.

The value tag included in the Common SIB info IE is used for indicating a value of the value tag for the respective SIB type in the neighbouring cell, whose content is the same as the current content of the corresponding SIB from the serving cell. The value tag is to be stored in the UE for possible later reuse.

Note that the Common SIB info IE can be in a list. The length of the list depends upon the number of SIB types that are common, up to a maximum specified in a predefined parameter, which can be named maxCommSIB.

In some examples, the Common SIB info IE is conditionally present in the New intra-frequency cells information group. More specifically, the Common SIB info IE is present if the New intra-frequency cells information group is sent in system information—otherwise, if the New intra-frequency cells information group is not sent in system information, then the Common SIB info IE is not included.

The conditional presence of the Common SIB info IE can be specified as follows, where BCH refers to "broadcast channel."

| Condition | Explanation |
|---|---|
| BCHopt | This IE is not needed when sent in SYSTEM INFORMATION. Otherwise, the IE is Optional |
| BCH | This IE is optional when sent in SYSTEM INFORMATION. Otherwise, the IE is not used |

The foregoing examples refer to including the Common SIB info IE in the Intra-frequency measurement system information, which specifies parameters for intra-frequency neighbouring cells (neighbouring cells that employ the same frequency as the source cell).

In alternative examples, the Common SIB info IE can similarly be included in system information for inter-frequency neighbouring cells (neighbouring cells that employ frequencies different from the frequency of the source cell).

Although the examples described herein refer to the Common SIB info IE used to identify common SIB types, it is noted that a different IE can be employed for identifying common SB(s) in other examples.

Alternatively, in further implementations, the Common SIB info IE can be included in a new SIB type (a new message, rather than an existing message as described above).

For example, the new SIB type can have the following format.

| Information Element/Group name | Need | Multi | Type and reference |
|---|---|---|---|
| Intra-frequency neighbouring cells | OP | 1 to <maxCellMeas> | |
| >CHOICE mode | MP | | |
| >> FDD | | | |
| >>>Primary CPICH info | OP | | Primary CPICH info 10.3.6.60 |
| >>> Common SIB info | MP | 1 to <maxCommSIB> | |
| >>>>Common SIB indicator | MP | | Enumerated(SIB1, SIB2, SIB5, . . .) |
| >>>>Value tag | MD | | Integer (1 . . . 4) |
| >>TDD | | | |
| >>>Primary CCPCH info | MP | | Primary CCPCH info 10.3.6.57 |
| >>> Common SIB info | MP | 1 to <maxCommSIB> | |
| >>>>Common SIB indicator | MP | | Enumerated(SIB1, SIB2, SIB5, . . .) |
| >>>>Value tag | MD | | Integer (1 . . . 4) |
| Inter-frequency neighbouring cells | OP | 1 to <maxCellMeas> | |
| >Frequency info | MD | | Frequency info 10.3.6.36 |
| >CHOICE mode | MP | | |
| >> FDD | | | |
| >>>Primary CPICH info | OP | | Primary CPICH info 10.3.6.60 |
| >>> Common SIB info | MP | 1 to <maxCommSIB> | |
| >>>>Common SIB indicator | MP | | Enumerated(SIB1, SIB2, SIB5, . . .) |
| >>>>Value tag | MD | | Integer (1 . . . 4) |
| >>TDD | | | |
| >>>Primary CCPCH info | MP | | Primary CCPCH info 10.3.6.57 |
| >>> Common SIB info | MP | 1 to <maxCommSIB> | |
| >>>>Common SIB indicator | MP | | Enumerated(SIB1, SIB2, SIB5, . . .) |
| >>>>Value tag | MD | | Integer (1 . . . 4) |

A second format of the new SIB type including a specific common SIB1 value tag is provided below.

| Information Element/Group name | Need | Multi | Type and reference |
|---|---|---|---|
| Intra-frequency neighbouring cells | OP | 1 to <maxCellMeas> | |
| >CHOICE mode | MP | | |
| >> FDD | | | |
| >>>Primary CPICH info | OP | | Primary CPICH info 10.3.6.60 |
| >>> Common SIB info | MP | 1 to <maxCommSIB> | |
| >>>>Common SIB indicator | MP | | Enumerated(SIB2, SIB5, . . .) |
| >>>>Value tag | MD | | Integer (1 . . . 4) |
| >>> SIB1 Value tag | OP | | Integer (1 . . . 256) |
| >>TDD | | | |
| >>>Primary CCPCH info | MP | | Primary CCPCH info 10.3.6.57 |
| >>> Common SIB info | MP | 1 to <maxCommSIB> | |
| >>>>Common SIB indicator | MP | | Enumerated(SIB2, SIB5, . . .) |
| >>>>Value tag | MD | | Integer (1 . . . 4) |
| >>> SIB1 Value tag | OP | | Integer (1 . . . 256) |
| Inter-frequency neighbouring cells | OP | 1 to <maxCellMeas> | |
| >Frequency info | MD | | Frequency info 10.3.6.36 |
| >CHOICE mode | MP | | |
| >> FDD | | | |
| >>>Primary CPICH info | OP | | Primary CPICH info 10.3.6.60 |
| >>> Common SIB info | MP | 1 to <maxCommSIB> | |
| >>>>Common SIB indicator | MP | | Enumerated(SIB2, SIB5, . . .) |
| >>>>Value tag | MD | | Integer (1 . . . 4) |
| >>> SIB1 Value tag | OP | | Integer (1 . . . 256) |
| >>TDD | | | |
| >>>Primary CCPCH info | MP | | Primary CCPCH info 10.3.6.57 |
| >>> Common SIB info | MP | 1 to <maxCommSIB> | |
| >>>>Common SIB indicator | MP | | Enumerated(SIB2, SIB5. . . .) |
| >>>>Value tag | MD | | Integer (1 . . . 4) |
| >>> SIB1 Value tag | OP | | Integer (1 . . . 256) |

The new SIB type can include a first section for intra-frequency neighbouring cells and a second section for intra-frequency neighbouring cells, where the maximum number of neighbouring cells is specified by the parameter maxCellMeas.

Communications between an RNC and a UE can be according to a frequency division duplex (FDD) mode or a time division duplex (TDD) mode. In the intra-frequency neighbouring cells section of the new SIB type, if the mode of communication is FDD, then the Common SIB info IE can be included with the Primary CPICH info group, which provides information pertaining to the common pilot channel (CPICH). On the other hand, if the communication mode is the TDD mode, then the Common SIB info IE is included with the Primary CCPCH info information group, which includes information pertaining to the common control physical channel (CCPCH). The primary CPICH info IE and the Primary CCPCH info IE are according to current standards are described in 3GPP TS 25.331. They identify the cell to which Common SIB info IE relates.

The inter-frequency section of the new SIB type also can be similarly divided into two subsections for FDD mode and TDD mode communications.

In some cases, the SIB type(s) common between a serving cell and a neighbouring cell may be the same for all neighbouring cells. Instead of signaling such common SIB type(s) separately using multiple instances of the Common SIB info IE, as discussed above, in some alternative implementations, the Common SIB info IE can have optional IEs. In such examples, the first Common SIB info IE in a list includes both the Common SIB indicator and the value tag, as discussed above. However, subsequent Common SIB info IEs can omit the common SIB indicator and value tag, and each such subsequent Common SIB info IE implies that the IEs associated with the previous Common SIB info IE in the list are used.

For example, consider a list of eight neighbouring cells, where the list includes eight Common SIB info IEs for the respective eight neighbouring cells. The list can include eight instances of the New intra-frequency cells information group in the Intra-frequency cell info list information group discussed further above. Assume that the Common SIB info IE for the first neighbouring cell has a Common SIB indicator of SIB1 and value tag of 1, and the Common SIB info IE for the fifth neighbouring cell has a Common SIB indicator of SIB2 and value tag of 3. Also assume that the Common SIB info IEs for the second, fourth, and sixth cells in the list do not have the respective Common SIB indicator and value tag IEs. In this example, the Common SIB indicator and value tag IEs of the Common SIB info IE specified for the first neighbouring cell would apply to the first, second, and fourth cells, and the Common SIB indicator and value tag IEs of the Common SIB info IE specified for the fifth neighbouring cell would apply to the fifth and sixth cells.

To implement the foregoing, the Common SIB info IE can be modified as follows, where the Common SIB indicator and value tag IEs are optional elements:

| Information Element/Group name | Need | Multi | Type and reference |
| --- | --- | --- | --- |
| > Common SIB info | CV-BCH | 1 to <maxCommSIB> | |
| >>Common SIB indicator | MD | | Enumerated(SIB1, SIB2, SIB5, . . .) |
| >>Value tag | MD | | Integer (1 . . . 4) |

A second format of the Common SIB info IE including an SIB1 value tag is provided below:

| Information Element/Group name | Need | Multi | Type and reference |
| --- | --- | --- | --- |
| > Common SIB info | CV-BCH | 1 to <maxCommSIB> | |
| >>Common SIB indicator | MD | | Enumerated(SIB2, SIB5, . . .) |
| >>Value tag | MD | | Integer (1 . . . 4) |
| >Common SIB1 indicator | CV-BCH | | Enumerated (TRUE) |
| >> SIB1 Value tag | MD | | Integer (1 . . . 256) |

Alternatively, an optional Common SIB info For All Intra Frequency Cells IE can be added that applies to all neighbouring cells or neighbouring cells of a certain type, such as all intra-frequency neighbours or inter-frequency neighbours. The example modified intra-frequency measurement system information group can be as follows:

| Information Element/Group name | Need | Multi | Type and reference |
| --- | --- | --- | --- |
| Intra-frequency measurement identity | MD | | Measurement identity 10.3.7.48 |
| Common SIB info For All Intra Frequency Cells | CV-BCH | 1 to <maxCommSIB> | |
| >>Common SIB indicator | MP | | Enumerated(SIB1, SIB2, SIB5, . . .) |
| >>Value tag | OP | | Integer (1 . . . 4) |
| <Other IEs not affected by this change are not shown here> | | | |

A second format of the modified intra-frequency measurement system information group including an SIB1 value tag is provided below:

| Information Element/Group name | Need | Multi | Type and reference |
| --- | --- | --- | --- |
| Intra-frequency measurement identity | MD | | Measurement identity 10.3.7.48 |
| Common SIB info For All Intra Frequency Cells | CV-BCH | 1 to <maxCommSIB> | |
| >>Common SIB indicator | MP | | Enumerated(SIB2, SIB5, . . .) |
| >>Value tag | OP | | Integer (1 . . . 4) |
| SIB1 Value tag | CV-BCH | | Integer (1 . . . 256) |
| <Other IEs not affected by this change are not shown here> | | | |

It is noted that the alternative signaling options discussed with the two tables above can also be applied to other solutions, such as Solutions 2-4 discussed below.

Solution 1 can be used to send the area scope extending indicator to a UE that is in idle mode. An idle mode UE does not have an RRC connection with an RNC. In addition, Solution 1 can be used to send the area scope extending indicator to a UE that is in certain connected modes (where the UE has established an RRC connection with an RNC). For example, such connected modes include the following modes as described by 3GPP TS 25.331: CELL_FACH (forward access channel); CELL_PCH (cell paging channel); and URA_PCH (UTRAN routing area paging channel). In other examples, other types of connected modes can be used.

Solution 2

In accordance with alternative implementations, referred to as Solution 2, the area scope extending indicator can be included in a dedicated message, instead of a broadcast message as used for Solution 1. Solution 2 can be employed for a UE in certain connected modes, which is a UE that has a radio connection with an RNC that can be used to communicate data. Such connected modes can include the following modes as described by 3GPP TS 25.331: CELL_DCH (dedicated channel); and CELL_FACH. In other examples, other connected modes can be used.

Figure 2:
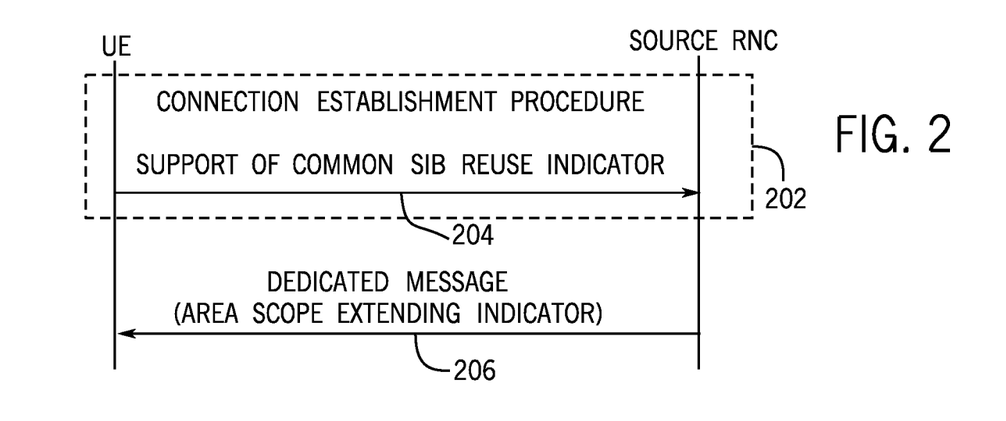

As shown in FIG. 2, the UE performs a connection establishment procedure (202) with a source RNC of a source cell (a cell currently serving the UE), for establishing a connection. In some examples, the connection establishment procedure can be a Radio Resource Control (RRC) connection establishment procedure for establishing an RRC connection.

As part of the connection establishment procedure (202), the UE can send (at 204) a UE capability indicator, including a Support of common SIB reuse indicator to the RNC, to indicate that the UE is capable of reusing common system information that is common among multiple cells (or other extended area). In response to the Support of common SIB reuse, the RNC sends (at 206) a dedicated message to the UE that contains an area scope extending indicator, for identifying the neighbouring cell(s) and SIB type(s) that is common between the source cell and the neighbouring cell(s).

The Support of common SIB reuse indicator can be included in an RRC CONNECTION SETUP COMPLETE message, and more specifically, in a UE radio access capability information group of the foregoing message. For example, the common SIB reuse capability indicator can be a new IE added to the UE radio access capability information group as set forth below (the remaining IEs are described in 3GPP TS 25.331, and will not be discussed further):

| Information Element/Group name | Need | Multi | Type and reference |
|---|---|---|---|
| Access stratum release indicator | MP<br>CV-<br>not_rrc_connec-<br>tionSetupComplete | | Enumerated(R99)<br>Enumerated(REL-4,<br>REL-5,<br>REL-6,<br>REL-7,<br>REL-8,<br>REL-9,<br>REL-10,<br>REL-11) |
| DL capability with simultaneous HS-DSCH configuration | CV-<br>not_iRAT_HoInfo | | Enumerated(32 kbps, 64 kbps, 128 kbps, 384 kbps) |

| Information Element/Group name | Need | Multi | Type and reference |
|---|---|---|---|
| PDCP capability | MP | | PDCP capability 10.3.3.24 |
| RLC capability | MP | | RLC capability 10.3.3.34 |
| Transport channel capability | MP | | Transport channel capability 10.3.3.40 |
| <Partly omitted> | | | |
| Support of common SIB reuse | OP | | Enumerated (TRUE) |
| UE based network performance measurements parameters | CV-<br>not_iRAT_HoInfo | | UE based network performance measurements parameters 10.3.3.53 |
| Support of UTRAN ANR | CV-<br>not_iRAT_HoInfo | | Enumerated (TRUE) |
| IMS Voice capability | CV-<br>not_iRAT_HoInfo | | IMS Voice capability 10.3.3.14b |
| Multiflow capability | CV-<br>not_iRAT_HoInfo | | UE Multiflow capability 10.3.3.21ba |
| Support of MAC-ehs window size extension | OP | | Enumerated (TRUE) |
| Support of UM RLC re-establishment via reconfiguration | CV-<br>not_iRAT_HoInfo | | Enumerated (TRUE) |

The absence of the common SIB reuse capability IE indicates that the UE does not support common system information reuse.

If both the UE and the RNC support common SIB reuse, then the RNC sends the area scope extending indicator in a dedicated message (at 206). The dedicated message can be a new message or an existing message. If using an existing message, the existing message can be a Measurement Control message, which can include an Intra-frequency cell info list information group as set forth below:

| Information Element/Group name | Need | Multi | Type and reference |
|---|---|---|---|
| CHOICE Intra-frequency cell removal | OP | | |
| >Remove all intra-frequency cells | | | |
| >Remove some intra-frequency cells | | | |
| >>Removed intra-frequency cells | MP | 1 to <maxCellMeas> | |
| >>>Intra-frequency cell id | MP | | Integer(0 . . . <maxCellMeas> − 1) |
| >Remove no intra-frequency cells | | | |
| New intra-frequency cells | OP | 1 to <maxCellMeas> | |
| >Intra-frequency cell id | OP | | Integer(0 . . . <maxCellMeas> − 1) |
| >Cell info | MP | | Cell info 10.3.7.2 |
| > Common SIB info | OP | 1 to <maxCommSIB> | |
| >>Common SIB indicator | MP | | Enumerated(SIB1, SIB2, SIB5, . . .) |
| >>Value tag | OP | | Integer (1 . . . 4) |
| >CHOICE mode specific info | MP | | |
| >>No information | | | |
| >>TDD 1.28 Mcps | | | |
| >>> SNPL Monitor Set Indicator | OP | | Bit string(5) |
| Cells for measurement | CV-<br>BCHopt | 1 to <maxCellMeas> | |
| >Intra-frequency cell id | MP | | Integer(0 . . . <maxCellMeas> − 1) |

| Information Element/Group name | Need | Multi | Type and reference |
|---|---|---|---|
| CSG Intrafrequency cell info | CV-BCHopt | | 10.3.7.121 |
| Intra-frequency SI Acquisition | CV-BCHopt | | 10.3.7.125 |

A second format of an Intra-frequency cell info list information group including a specific SIB1 value tag is provided below.

| Information Element/Group name | Need | Multi | Type and reference |
|---|---|---|---|
| CHOICE Intra-frequency cell removal | OP | | |
| >Remove all intra-frequency cells | | | |
| >Remove some intra-frequency cells | | | |
| >>Removed intra-frequency cells | MP | 1 to <maxCellMeas> | |
| >>>Intra-frequency cell id | MP | | Integer(0 . . . <maxCellMeas> − 1) |
| >Remove no intra-frequency cells | | | |
| New intra-frequency cells | OP | 1 to <maxCellMeas> | |
| >Intra-frequency cell id | OP | | Integer(0 . . . <maxCellMeas> − 1) |
| >Cell info | MP | | Cell info 10.3.7.2 |
| > Common SIB info | OP | 1 to <maxCommSIB> | |
| >>Common SIB indicator | MP | | Enumerated(SIB2, SIB5, . . .) |
| >>Value tag | OP | | Integer (1 . . . 4) |
| >SIB1 value tag | OP | | Integer (1 . . . 256) |
| >CHOICE mode specific info | MP | | |
| >>No information | | | |
| >>TDD 1.28 Mcps | | | |
| >>> SNPL Monitor Set Indicator | OP | | Bit string(5) |
| Cells for measurement | CV-BCHopt | 1 to <maxCellMeas> | |
| >Intra-frequency cell id | MP | | Integer(0 . . . <maxCellMeas> − 1) |
| CSG Intrafrequency cell info | CV-BCHopt | | 10.3.7.121 |
| Intra-frequency SI Acquisition | CV-BCHopt | | 10.3.7.125 |

The Intra-frequency cell info list information group includes a Common SIB info IE, similar to that described above in connection with Solution 1.

A new dedicated message can have the following format, which is similar to the format of the new SIB type for Solution 1 discussed above:

| Information Element/Group name | Need | Multi | Type and reference |
|---|---|---|---|
| Intra-frequency neighbouring cells | OP | 1 to <maxCellMeas> | |
| >Cell Identity | OP | | Cell Identity 10.3.2.2 |
| >CHOICE mode | MP | | |
| >> FDD | | | |
| >>>Primary CPICH info | OP | | Primary CPICH info 10.3.6.60 |
| >>> Common SIB info | OP | 1 to <maxCommSIB> | |
| >>>>Common SIB indicator | MP | | Enumerated(SIB1, SIB2, SIB5, . . .) |
| >>>> Value tag | OP | | Integer (1 . . . 4) |
| >>TDD | | | |
| >>>Primary CCPCH info | MP | | Primary CCPCH info 10.3.6.57 |
| >>> Common SIB info | OP | 1 to <maxCommSIB> | |
| >>>> Common SIB indicator | MP | | Enumerated(SIB1, SIB2, SIB5, . . .) |
| >>>> Value tag | OP | | Integer (1 . . . 4) |
| Inter-frequency neighbouring cells | OP | 1 to <maxCellMeas> | |
| >Cell Identity | OP | | Cell Identity 10.3.2.2 |
| >CHOICE mode | MP | | |
| >> FDD | | | |
| >>>Primary CPICH info | OP | | Primary CPICH info 10.3.6.60 |
| >>> Common SIB info | OP | 1 to <maxCommSIB> | |

-continued

| Information Element/Group name | Need | Multi | Type and reference |
|---|---|---|---|
| >>>> Common SIB indicator | MP | | Enumerated(SIB1, SIB2, SIB5, . . .) |
| >>>> Value tag | OP | | Integer (1 . . . 4) |
| >>TDD | | | |
| >>>Primary CCPCH info | MP | | Primary CCPCH info 10.3.6.57 |
| >>> Common SIB info | OP | 1 to <maxCommSIB> | |
| >>>> Common SIB indicator | MP | | Enumerated(SIB1, SIB2, SIB5, . . .) |
| >>>> Value tag | OP | | Integer (1 . . . 4) |

A second format of the new dedicated message including a specific SIB1 value tag is provided below.

| Information Element/Group name | Need | Multi | Type and reference |
|---|---|---|---|
| Intra-frequency neighbouring cells | OP | 1 to <maxCellMeas> | |
| >Cell Identity | OP | | Cell Identity 10.3.2.2 |
| >CHOICE mode | MP | | |
| >> FDD | | | |
| >>>Primary CPICH info | OP | | Primary CPICH info 10.3.6.60 |
| >>> Common SIB info | OP | 1 to <maxCommSIB> | |
| >>>>Common SIB indicator | MP | | Enumerated(SIB2, SIB5, . . .) |
| >>>> Value tag | OP | | Integer (1 . . . 4) |
| >>> SIB1 value tag | OP | | Integer (1 . . . 256) |
| >>TDD | | | |
| >>>Primary CCPCH info | MP | | Primary CCPCH info 10.3.6.57 |
| >>> Common SIB info | OP | 1 to <maxCommSIB> | |
| >>>> Common SIB indicator | MP | | Enumerated(SIB2, SIB5, . . .) |
| >>>> Value tag | OP | | Integer (1 . . . 4) |
| >>> SIB1 value tag | OP | | Integer (1 . . . 256) |
| Inter-frequency neighbouring cells | OP | 1 to <maxCellMeas> | |
| >Cell Identity | OP | | Cell Identity 10.3.2.2 |
| >CHOICE mode | MP | | |
| >>FDD | | | |
| >>>Primary CPICH info | OP | | Primary CPICH info 10.3.6.60 |
| >>> Common SIB info | OP | 1 to <maxCommSIB> | |
| >>>> Common SIB indicator | MP | | Enumerated(SIB1, SIB2, SIB5, . . .) |
| >>>> Value tag | OP | | Integer (1 . . . 4) |
| >>> SIB1 value tag | OP | | Integer (1 . . . 256) |
| >>TDD | | | |
| >>>Primary CCPCH info | MP | | Primary CCPCH info 10.3.6.57 |
| >>> Common SIB info | OP | 1 to <maxCommSIB> | |
| >>>> Common SIB indicator | MP | | Enumerated(SIB1, SIB2, SIB5, . . .) |
| >>>> Value tag | OP | | Integer (1 . . . 4) |
| >>> SIB1 value tag | OP | | Integer (1 . . . 256) |

Alternatively, the content of the table above can be included in another existing message, instead of being in a new message.

Solution 3

The foregoing describes solutions that either employ a broadcast message (Solution 1) or a dedicated message (Solution 2) to send the area scope extending indicator. In alternative implementations, referred to as Solution 3, Solutions 1 and 2 can be combined, to allow an RNC to selectively use a broadcast message or a dedicated message to communicate the area scope extending indicator to a UE. Note that the RNC can also send the area scope extending indicators in both a broadcast message and a dedicated message.

Figure 3:
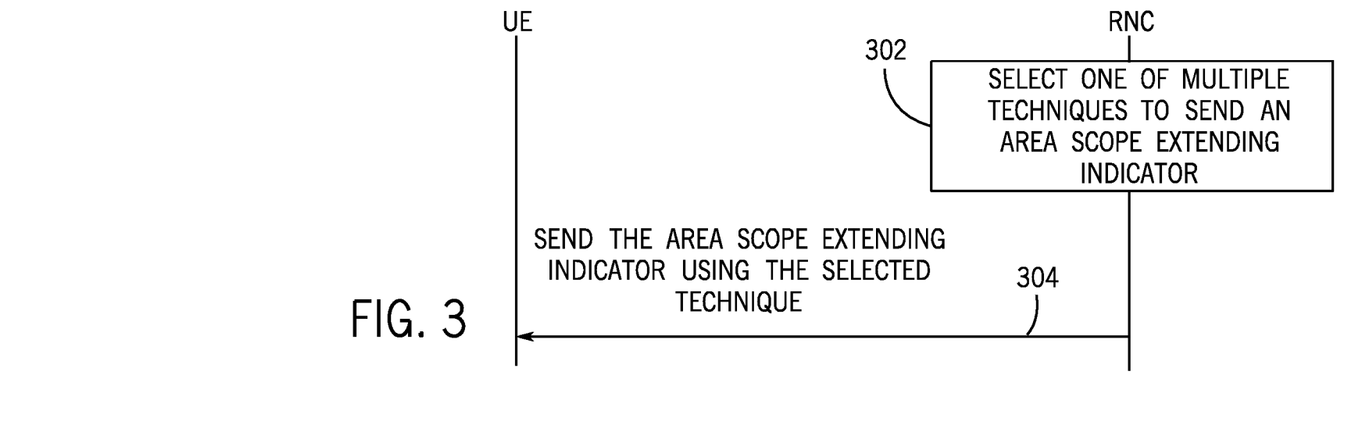

FIG. 3 is a flow diagram of an example process according to some implementations. As depicted in FIG. 3, the RNC selects (at 302) one of multiple techniques to send the area scope extending indicator. The multiple techniques can include a technique according to Solution 1, a technique according to Solution 2, or a technique according to combined Solutions 1 and 2. The selection of the technique to use can be based on the mode that the UE is in, such as idle mode or certain connected modes. If a target UE is in an idle mode or certain specified connected modes (e.g. CELL_FACH, CELL_PCH, URA_PCH), then the RNC can select Solution 1 to send a broadcast message containing the area scope extending indicator. If the target UE is in other connected modes (e.g. CELL_PCH, CELL_FACH), then the RNC can select Solution 2 to send a dedicated message containing the area scope extending indicator. If the RNC is to send the area scope extending indicator to multiple UEs that are in different modes, then the RNC can send the area scope extending indicator in both broadcast and dedicated messages.

The RNC then sends (at 304) the area scope extending indicator using the selected technique.

Solution 4

The foregoing describes examples where the RNC sends the area scope extending indicator to a UE. Alternatively, the area scope extending indicator can be sent from one UE to another UE, assuming that the UEs are in physical proximity to each other such that a direct wireless link can be established between the UEs. As examples, the UEs can be in the same building, in the same room, in the same car, and so forth. UEs that are in physical proximity to each other are likely to be camped on the same cell and/or have the same neighbouring cells.

The wireless link between the UEs can include a Bluetooth link, a WiFi link (e.g. a WiFi Direct link), a near-field communication (NFC) link, an infrared link, a device-to-device (D2D) link, or other link.

A first UE can send the full system information (read by the first UE from an RNC) to a second UE. Alternatively, or additionally, the first UE can send the area scope extending indicator to the second UE, which identifies certain system information that is common between multiple cells. The system information of a mobile communications network can be exchanged as part of user plane data or as part of control signaling in the wireless link between the UEs.

In a scenario where the UEs are camped on the same cell, it is likely that one of the UEs (the first UE) reselected and camped on the cell earlier than the other UE (the second UE). As a result, the first UE knows if and which of the system information between the source and target cells is common as a result of the reselection process. This knowledge regarding common system information between the source and target cells can be sent by the first UE to the second UE over a short-range wireless communication, such as over any of the wireless links noted above.

In some examples, the area scope extending indicator can be sent by the first UE to the second UE prior to the second UE reselecting to the same target cell. As a result, the second UE can be informed in advance before reselecting to the target cell that certain system information is common between the source cell and target cell. In this way, the second UE can avoid re-reading the common system information, which saves resources of the second UE.

In a scenario where both UEs are camped on two different neighbouring cells (which may be a temporary situation in practice), it is possible that the UEs can exchange full system information directly using a short-range communication. For this latter solution to work, an assumption can be made that the short range direct communication cost for the UEs (e.g. in terms of energy consumption or communication latency) due to the exchange of common system information is lower than reading the common system information from the RNC. This can be the case where the radio interface communication between the RNC and UEs is less energy efficient and slower than the short range communication between UEs.

Figure 4:
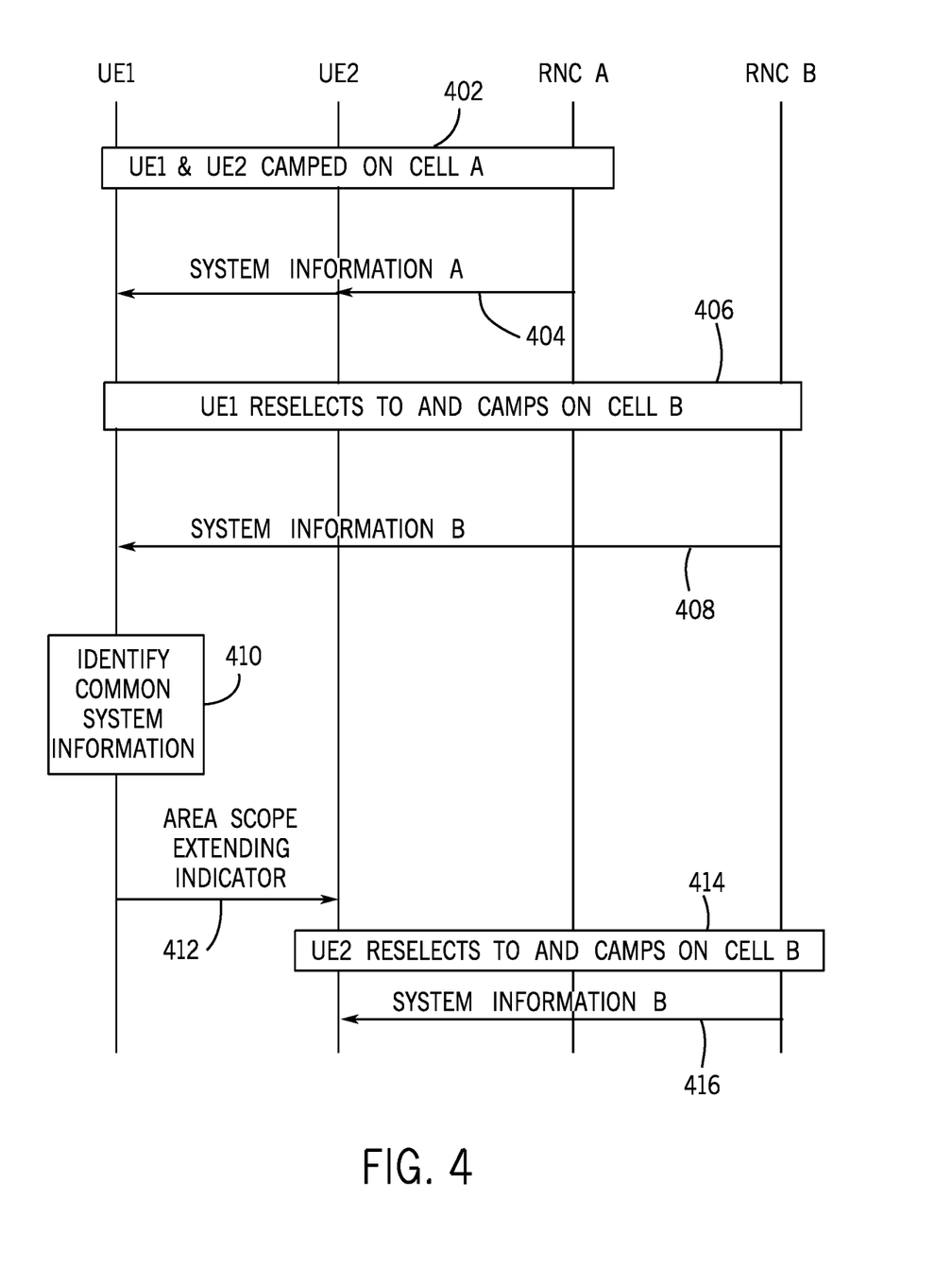
FIG. 4 is a flow diagram of a process for sending an area scope extending indicator between UEs, according to alternative implementations.

FIG. 4 is a flow diagram of an example process that involves UE1, UE2, RNC A (in cell A), and RNC B (in cell B). In the FIG. 4 example, it is assumed that both UE1 and UE2 are initially camped on cell A (at 402). System information A is broadcast (at 404) from RNC A, which is received by UE1 and UE2.

Next, it is assumed that UE1 reselects to and camps on cell B (at 406). After the reselection, RNC B of cell B broadcast (at 408) system information B, which is received by UE1.

Once UE1 has received system information B, UE1 can identify (at 410) certain system information (e.g. certain SIB type(s) and/or certain SB(s)) that is (are) common between cell A and cell B. This identifying can be based on comparing system information A to system information B by UE1.

Once the common system information is identified by UE1, UE1 sends (at 412) an area scope extending indicator (similar in format to any of the indicators discussed above in connection with Solutions 1 and 2) to UE2.

Subsequently, UE2 reselects to and camps on cell B (at 414). After the reselection by UE2, RNC B broadcasts (at 416) system information B. UE2 would not have to re-read the common system information (in system information B) that was indicated by the area scope extending indicator sent by UE1, unless the respective value tag(s) indicate(s) that the common system information has been updated.

RNC Functionality

Figure 5:
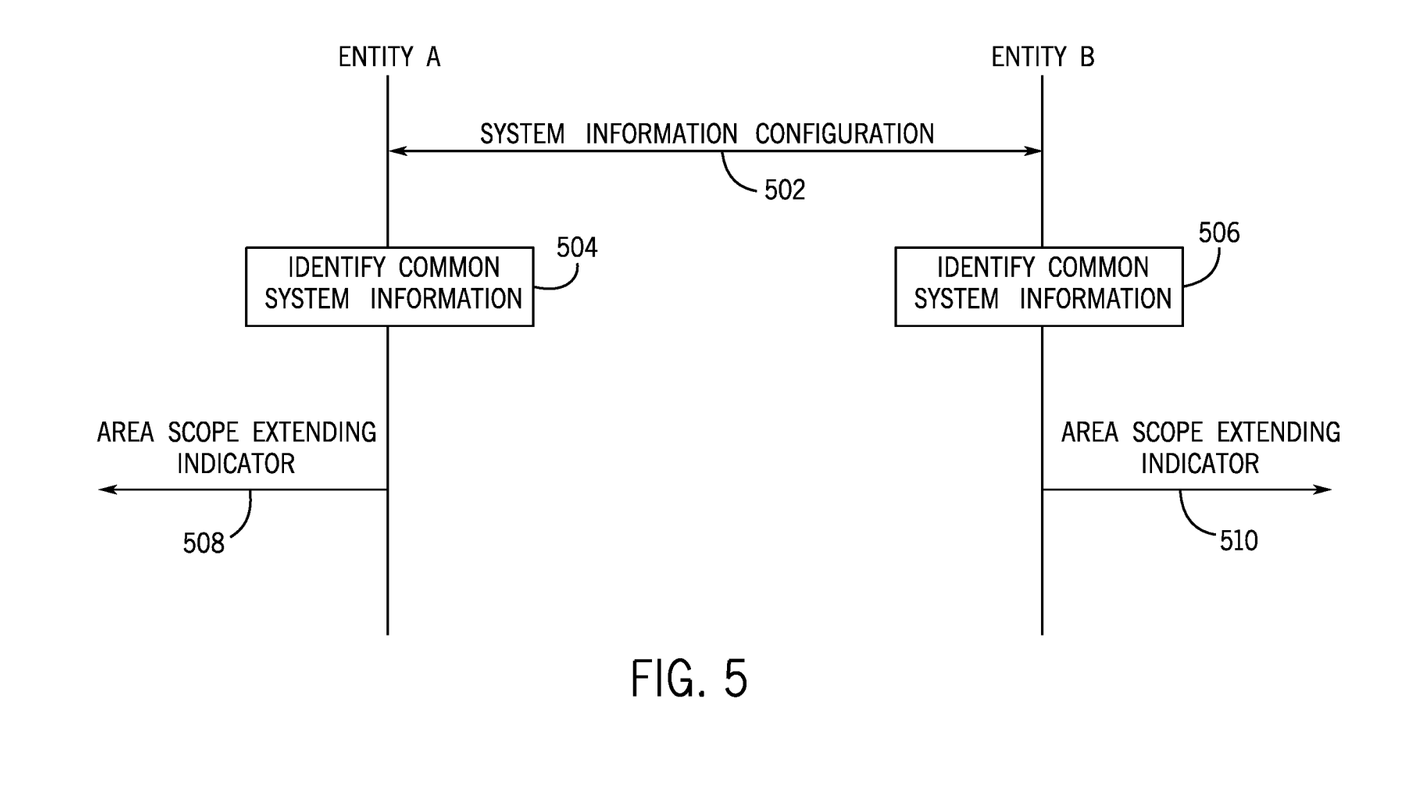
FIG. 5 is a flow diagram of tasks performed by wireless access network entities, according to further implementations.

FIG. 5 is a flow diagram illustrating tasks performed by wireless access network entities (or more simply, "network entities") (Entity A and Entity B are shown in the example of FIG. 5), in accordance with some implementations. Entity A and Entity B can be separate RNCs that control respective different cells. Alternatively, Entity A and Entity B can be entities within a common RNC that controls different cells. In the latter example, Entity A and Entity B can be separate modules executable on the common RNC. The network entities exchange (at 502) system information configuration information, which describes the configuration of the system information of each cell. The system information configuration can describe the configuration of SIB types and of SBs.

Based on the system information configuration received from Entity B, Entity A is able to identify (at 504) the system information that is common between Entity A and Entity B. Similarly, based on the system information configuration received from Entity A, Entity B is able to identify (at 506) the system information that is common between Entity A and Entity B.

Although FIG. 5 depicts the tasks involving just two network entities, it is noted that more than two network entities can be involved, such that each network entity can identify common system information of more than two network entities.

Once the common system information is identified by each network entity, the network entities can send (at 508, 510) respective area scope extending indicators to corresponding UEs served by the network entities.

System Architecture

Figure 6:
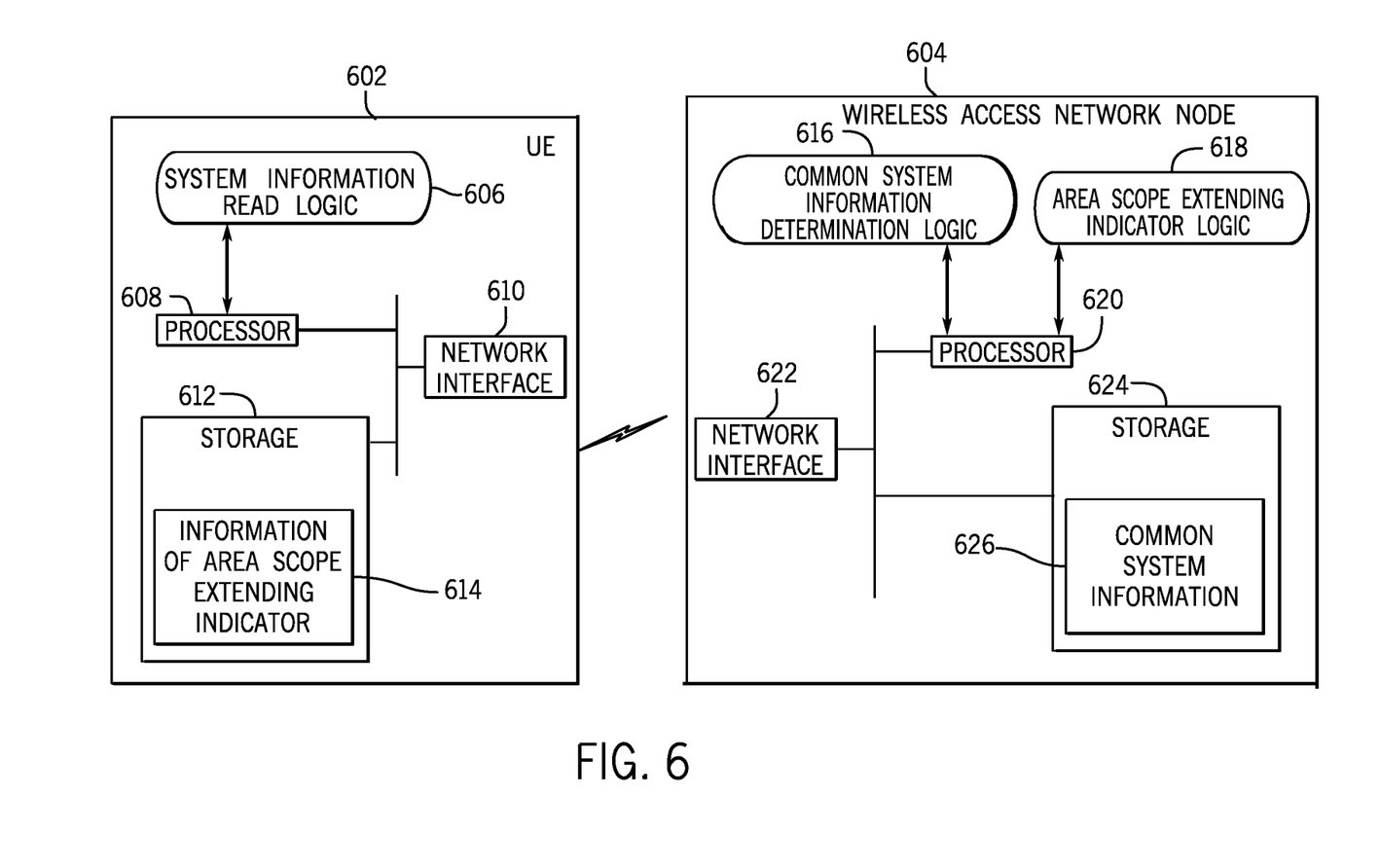
FIG. 6 is a block diagram of an example system including a UE and a wireless access network node, according to some implementations.

FIG. 6 is a block diagram of an example system that includes a UE 602 and a wireless access network node 604 (e.g. combination of an RNC and NodeB, or some other type of wireless access network node). The UE 602 includes system information read logic 606, which can include machine-readable instructions executable on one or more processors 608. A processor can include a microprocessor, microcontroller, processor module or subsystem, programmable integrated circuit, programmable gate array, or another control or computing device.

The processor(s) 608 can be coupled to a network interface 610 and a storage medium (or storage media) 612. The network interface 610 allows the UE 602 to wirelessly communicate with the wireless access network node 604.

The storage medium (or storage media) 612 can store information 614 of an area scope extending indicator that was received through the network interface 610 from the wireless access network node 604. The system information read logic 606 can use the stored information 614 of the area scope extending indicator to identify common system information that does not have to be re-read by the UE 602.

The wireless access network node 604 includes common system information determination logic 616 and area scope extending indicator logic 618, which can both be implemented as machine-readable instructions executable on one or more processors 620. The common system information determination logic 616 is able to identify common system information shared with other wireless access network node(s). A description of such common system information (626) can be stored in a storage medium (or storage media) 624 that is coupled to the processor(s) 620.

The processor(s) 620 can also be coupled to a network interface 622 to allow the wireless access network node 604 to communicate wirelessly with the UE 602.

The area scope extending indicator logic 618 is able to generate an area scope extending indicator that is to be sent to the UE 602, either in a broadcast message or dedicated message, or both.

Data and instructions are stored in respective storage devices, which are implemented as one or more computer-readable or machine-readable storage media (e.g. 612 and 624). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a first wireless access network entity from a second wireless access network entity, a system information configuration of the second wireless access network entity;
identifying, by the first wireless access network entity based on the received system information configuration, common system information between the first and second wireless access network entities;
sending, by the first wireless access network entity to a user equipment (UE), an indicator extending an area scope of the common system information to an extended area that is larger than a first area corresponding to a first area scope of the common system information; and
receiving, by the first wireless access network entity, a capability indication from the UE indicating that the UE supports an ability to reuse common system information of two or more cells.

2. The method of claim 1, wherein the system information configuration describes a configuration of system information of a cell associated with the second wireless access network entity.

3. The method of claim 2, wherein the system information configuration describes a configuration of system information block types.

4. The method of claim 2, wherein the system information configuration describes a configuration of a scheduling block.

5. The method of claim 1, further comprising:
sending, by the first wireless access network entity to the UE, an information element that identifies neighboring cells, wherein the indicator includes identification information that identifies the common system information shared by multiple cells including the neighboring cells identified by the information element.

6. The method of claim 5, wherein the identification information in the indicator comprises a list of system information blocks shared by the multiple cells.

7. The method of claim 1, wherein the first area includes a source cell, and the two or more cells comprise neighbor cells of the source cell.

8. The method of claim 1, wherein the common system information is interpretable by the UE as having the first area scope without the indicator.

9. The method of claim 1, wherein the indicator further includes a value tag associated with the common system information, the value tag useable to determine whether the common system information has been updated.

10. The method of claim 1, wherein sending the indicator comprises sending the indicator in a broadcast message.

11. The method of claim 10, wherein sending the indicator in the broadcast message comprises sending the indicator in a new system information block.

12. The method of claim 10, wherein sending the indicator in the broadcast message comprises sending the indicator in an information element in a system information block.

13. The method of claim 1, wherein sending the indicator comprises sending the indicator in a dedicated message.

14. A first wireless access network node comprising:
a processor; and
a non-transitory storage medium storing instructions executable on the processor to:
receive, from a second wireless access network node, a system information configuration of the second wireless access network node;
identify, based on the received system information configuration, common system information between the first and second wireless access network nodes;
send, to a user equipment (UE), an indicator extending an area scope of the common system information to an extended area that is larger than a first area corresponding to a first area scope of the common system information; and
receive a capability indication from the UE indicating that the UE supports an ability to reuse common system information of two or more cells.

15. The first wireless access network node of claim 14, wherein the instructions are executable on the processor to:
select a broadcast message to send the indicator to the UE that is in one of an idle mode and at least a subset of connected modes, or
select a dedicated message to send the indicator to the UE that is in one of a subset of connected modes.

16. The first wireless access network node of claim 14, wherein the instructions are executable on the processor to:
send, to the UE, an information element that identifies neighboring cells, wherein the indicator includes identification information that identifies the common system information shared by multiple cells including the neighboring cells identified by the information element.

17. A non-transitory storage medium comprising instructions that upon execution cause a first wireless access network node to:
receive, from a second wireless access network node, a system information configuration of the second wireless access network node;
identify, based on the received system information configuration, common system information between the first and second wireless access network nodes;
send, to a user equipment (UE), an indicator extending an area scope of the common system information to an extended area that is larger than a first area corresponding to a first area scope of the common system information; and
receive a capability indication from the UE indicating that the UE supports an ability to reuse common system information of two or more cells.

* * * * *